United States Patent
Karpin et al.

(10) Patent No.: US 9,310,927 B2
(45) Date of Patent: Apr. 12, 2016

(54) TOUCH IDENTIFICATION FOR MULTI-TOUCH TECHNOLOGY

(71) Applicant: Parade Technologies, Ltd., Santa Clara, CA (US)

(72) Inventors: Oleksandr Karpin, Lviv (UA); Volodymyr Hutnyk, Rohatyn District (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 14/140,909

(22) Filed: Dec. 26, 2013

(65) Prior Publication Data

US 2014/0191995 A1    Jul. 10, 2014

Related U.S. Application Data

(63) Continuation of application No. 12/767,722, filed on Apr. 26, 2010, now Pat. No. 8,633,904.

(60) Provisional application No. 61/172,338, filed on Apr. 24, 2009.

(51) Int. Cl.
    *G06F 3/041*    (2006.01)
    *G06F 3/044*    (2006.01)
    *G06F 3/0488*   (2013.01)

(52) U.S. Cl.
    CPC ............ *G06F 3/0416* (2013.01); *G06F 3/044* (2013.01); *G06F 3/04883* (2013.01); *G06F 2203/04104* (2013.01)

(58) Field of Classification Search
    CPC ... G06F 3/0416; G06F 3/044; G06F 3/04883; G06F 2203/04104

USPC ..................................... 345/173–183
See application file for complete search history.

(56) References Cited

U.S. PATENT DOCUMENTS

| | | | |
|---|---|---|---|
| 4,234,871 A | 11/1980 | Guglielmi et al. | |
| 4,293,734 A | 10/1981 | Pepper | |

(Continued)

FOREIGN PATENT DOCUMENTS

| | | |
|---|---|---|
| JP | 10031547 A | 2/1998 |
| JP | 2000115306 A | 4/2000 |
| WO | 9737293 A | 10/1997 |

OTHER PUBLICATIONS

U.S. Appl. No. 12/767,722: "Touch Identification for Multi-Touch Technology" Oleksandr Karpin et al., filed Apr. 26, 2010; 56 pages.

(Continued)

*Primary Examiner* — Christopher E Leiby
(74) *Attorney, Agent, or Firm* — Morgan, Lewis & Bockius LLP

(57) ABSTRACT

A first plurality of contact locations may be determined in view of a first scan of a touch-sensing surface and a second plurality of contact locations may be determined in view of a second scan of the touch-sensing surface. A number of total contact locations may be identified in view of the first plurality of contact locations and the second plurality of contact locations. Furthermore, a first correlation process may be performed when the number of total contact locations satisfies a threshold number and a second correlation process may be performed when the number of total contact locations does not satisfy the threshold number.

27 Claims, 8 Drawing Sheets

(56) References Cited

U.S. PATENT DOCUMENTS

| | | | |
|---|---|---|---|
| 4,359,720 | A | 11/1982 | Chai et al. |
| 5,543,591 | A | 8/1996 | Gillespie et al. |
| 5,666,113 | A | 9/1997 | Logan |
| 5,917,906 | A | 6/1999 | Thornton |
| 6,262,717 | B1 | 7/2001 | Donohue et al. |
| 6,473,069 | B1 | 10/2002 | Gerpheide |
| 6,681,031 | B2 | 1/2004 | Cohen et al. |
| 6,704,005 | B2 | 3/2004 | Kato et al. |
| 7,030,861 | B1 | 4/2006 | Westerman et al. |
| 7,148,875 | B2 | 12/2006 | Rosenberg et al. |
| 7,577,925 | B2* | 8/2009 | Zotov et al. .................. 715/863 |
| 7,643,006 | B2 | 1/2010 | Hill et al. |
| 8,120,584 | B2 | 2/2012 | Grivna et al. |
| 8,164,577 | B2* | 4/2012 | Tsuzaki ............... G06F 3/0412 345/173 |
| 8,239,784 | B2* | 8/2012 | Hotelling et al. ............ 715/830 |
| 8,537,119 | B1 | 9/2013 | Grivna et al. |
| 2006/0066582 | A1 | 3/2006 | Lyon et al. |
| 2007/0152984 | A1 | 7/2007 | Ording et al. |
| 2008/0036743 | A1 | 2/2008 | Westerman et al. |
| 2008/0041639 | A1* | 2/2008 | Westerman et al. ....... 178/18.01 |
| 2008/0150905 | A1 | 6/2008 | Grivna et al. |
| 2008/0165132 | A1* | 7/2008 | Weiss et al. .................. 345/173 |
| 2008/0211766 | A1* | 9/2008 | Westerman et al. .......... 345/156 |
| 2009/0174675 | A1 | 7/2009 | Gillespie et al. |
| 2009/0243998 | A1 | 10/2009 | Wang |
| 2009/0284495 | A1* | 11/2009 | Geaghan et al. .............. 345/174 |
| 2009/0289911 | A1* | 11/2009 | Nagai ........................... 345/173 |
| 2010/0214231 | A1* | 8/2010 | D'Souza et al. .............. 345/173 |

OTHER PUBLICATIONS

USPTO Advisory Action for U.S. Appl. No. 12/767,722 dated Mar. 1, 2013; 3 pages.
USPTO Advisory Action for U.S. Appl. No. 12/767,722 dated Oct. 17, 2013; 10 pages.
USPTO Final Rejection for U.S. Appl. No. 12/767,722 dated Jan. 9, 2013; 20 pages.
USPTO Final Rejection for U.S. Appl. No. 12/767,722 dated Jul. 11, 2013; 18 pages.
USPTO Non Final Rejection for U.S. Appl. No. 12/767,722 dated Apr. 10, 2013; 18 pages.
USPTO Non Final Rejection for U.S. Appl. No. 12/767,722 dated Aug. 23, 2012; 16 pages.
USPTO Notice of Allowance for U.S. Appl. No. 12/767,722 dated Nov. 27, 2013; 10 pages.
"Adding Tactile Feedback to Touchscreen Applications," TouchSense Technology for the Touchscreen Interface, Immersion Corporation, 2006, 4 pages.
"An Embedded Solution for Playing VibeTonz Touch Sensations on Mobile Handsets," VibeTonz Mobile Player, Immersion Corporation, 2005, 4 pages.
"Bringing the Powerful Sensation of Touch to the Mobile Phone Market," VibeTonz System, Immersion Corporation, 2005, 6 pages.

* cited by examiner

TOUCH IDENTIFICATION FOR MULTI-TOUCH TECHNOLOGY

RELATED APPLICATIONS

This application is a continuation of U.S. application Ser. No. 12/767,722, filed Apr. 26, 2010, which claims priority to U.S. Provisional Patent Application No. 61/172,338, filed Apr. 24, 2009, all of which are incorporated by reference herein in their entirety.

TECHNICAL FIELD

This disclosure relates to the field of user interface devices and, in particular, to identification of multiple touches at a touch sensing surface.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of an object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include, for example, sensor arrays having two dimensions for detecting movement in a plane. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch panels, or touchscreen panels, are transparent display overlays which are typically either pressure-sensitive (resistive or piezoelectric), electrically-sensitive (capacitive), acoustically-sensitive (surface acoustic wave (SAW)), or photo-sensitive (infrared). The effect of such overlays allows a display to be used as an input device, removing or augmenting the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, a touch-sensing surface having row and column sensor elements may report touch contact locations using a coordinate system, and said touch locations may be reported paired with a touch or finger identifier. A touch controller performing a scan of such a touch-sensing surface may scan each row and column element, and store data from such scan in a memory where it is analyzed to determine contact locations. Said data is normally processed in a particular sequence, such that if multiple contacts are present at the touch-sensing surface, each of the contacts is detected in a particular order. In some situations, it is possible that multiple contacts detected by a first scan may be detected in a different order in a subsequent second scan if the contacts have moved between the first and second scans.

Figure 3:
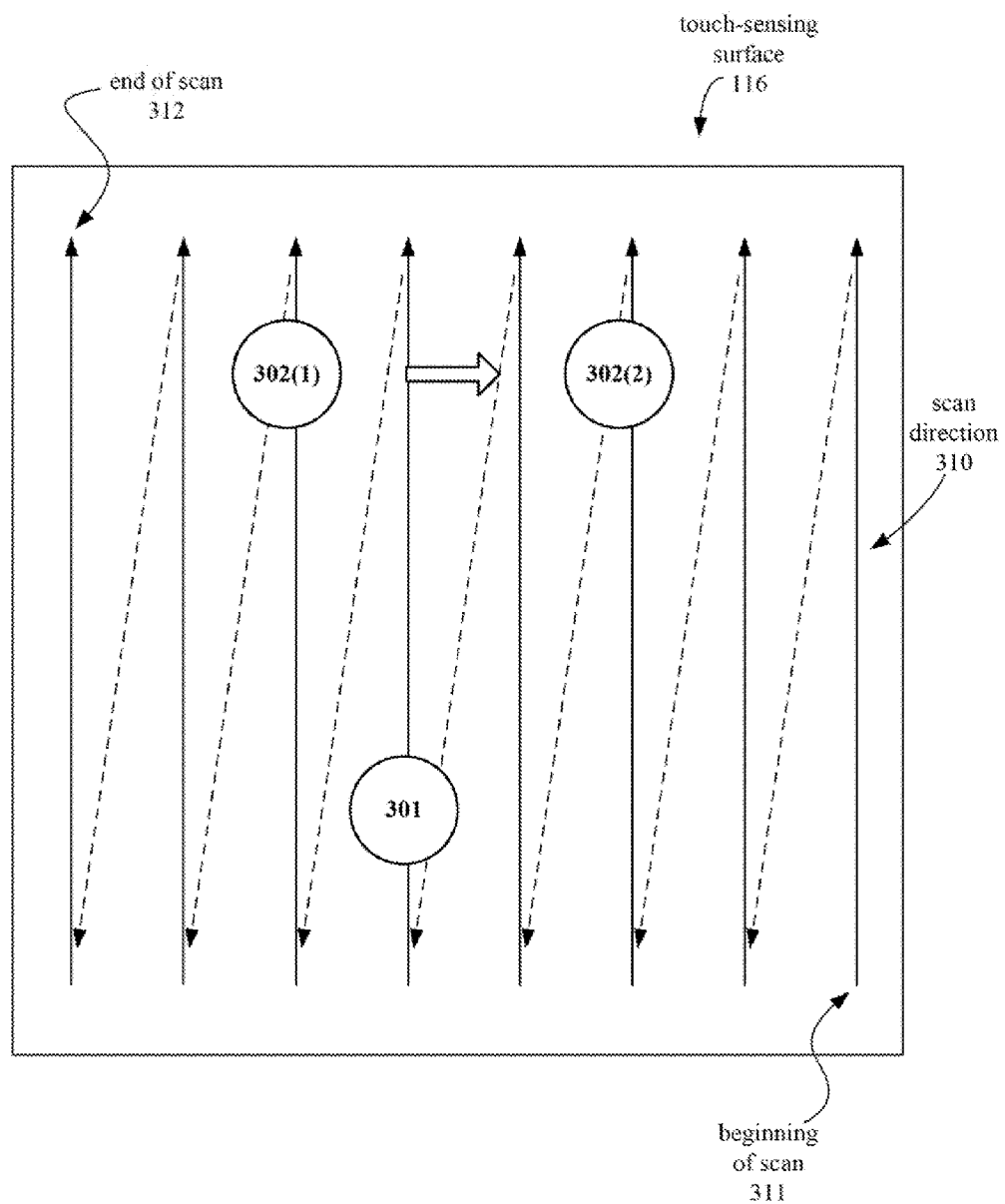
FIG. 3 illustrates an embodiment of a touch sensing surface.

For example, FIG. 3 illustrates a touch-sensing surface 116 on which two contacts, 301 and 302, are present. Contact 302(1) designates a location of contact 302 as detected by a first scan, and contact 302(2) designates a location of contact 302 as detected by a second scan. Contact 301 does not move and is therefore detected at the same location by the first and second scans. The contacts 301 and 302 may represent touches by a first finger and a second finger, respectively. In accord with the illustration of FIG. 3, the first finger may remain stationary on the touch-sensing surface, while the second finger moves from location 302(1) to 302(2). Each scan of the touch-sensing surface 116 begins at location 311 and proceeds in direction 310 to end at location 312. Following scanning, the measured touch information may be analyzed to determine touch contact locations and correlation of said locations with contacts identified in a prior scan.

If the data analysis is performed following the same sequence as when the panel was scanned, the first scan will detect contact 301 first and contact 302(1) second. In the subsequent second scan, however, contact 302(2) will be detected first and contact 301 will be detected second.

Thus, the order of detection during data analysis may not be a reliable way to correlate contacts detected by a first scan with contacts detected by a subsequent scan. With regard to the example of FIG. 3, due to their motion between scans, the contacts 302(1) and 302(2) may not be reliably recognized between the two scans as having been caused by the same finger. In one embodiment, the inability to accurately correlate contacts from one scan to the next may make applications such as multi-touch gesture recognition and other advanced user interface (UI) software unreliable.

In one embodiment, a touch controller may use multiple methods to correlate contacts from one scan to a subsequent scan. For example, a least squares method and a nearest neighbor method may be implemented by a touch controller to correlate up to five or more contacts at the touch-sensing surface. In one embodiment, this scheme reduces the amount of computation used for correlating contacts, such that up to five fingers can be identified and tracked on a touch-sensing surface using a low computation integrated circuit (IC), such as a 4 MIPS IC. In one embodiment, the maximum number of contacts that can be tracked and correlated depends on the processor throughput.

In one embodiment, the two methods being used may differ in complexity. A least squares method, for example, may be more computationally complex ($O(N!)$ or $O(N^4)$) than a nearest neighbor method ($O(N)$). The more accurate, but more computationally complex method may be used when less than a threshold number of contacts is detected at the touch-sensing surface.

In one embodiment of a method for tracking contact locations between scans, a contact identifier may be assigned to each contact location detected by a scan. The contact identifier may uniquely identify a contact from one scan to a subsequent scan. For example, a contact by a finger moving across the touch-sensing surface may have a contact identifier unique from all other contacts at the touch-sensing surface. Each of the contact locations on subsequent scans having the same contact identifier may be caused by the same finger or other object contacting the touch-sensing surface.

In one embodiment, a touch controller may also identify contacts that have not moved during the time between a first scan and a subsequent scan. The touch controller may exclude the unmoved contacts from the calculations to reduce the amount of computation for performing the correlation process.

Figure 1:
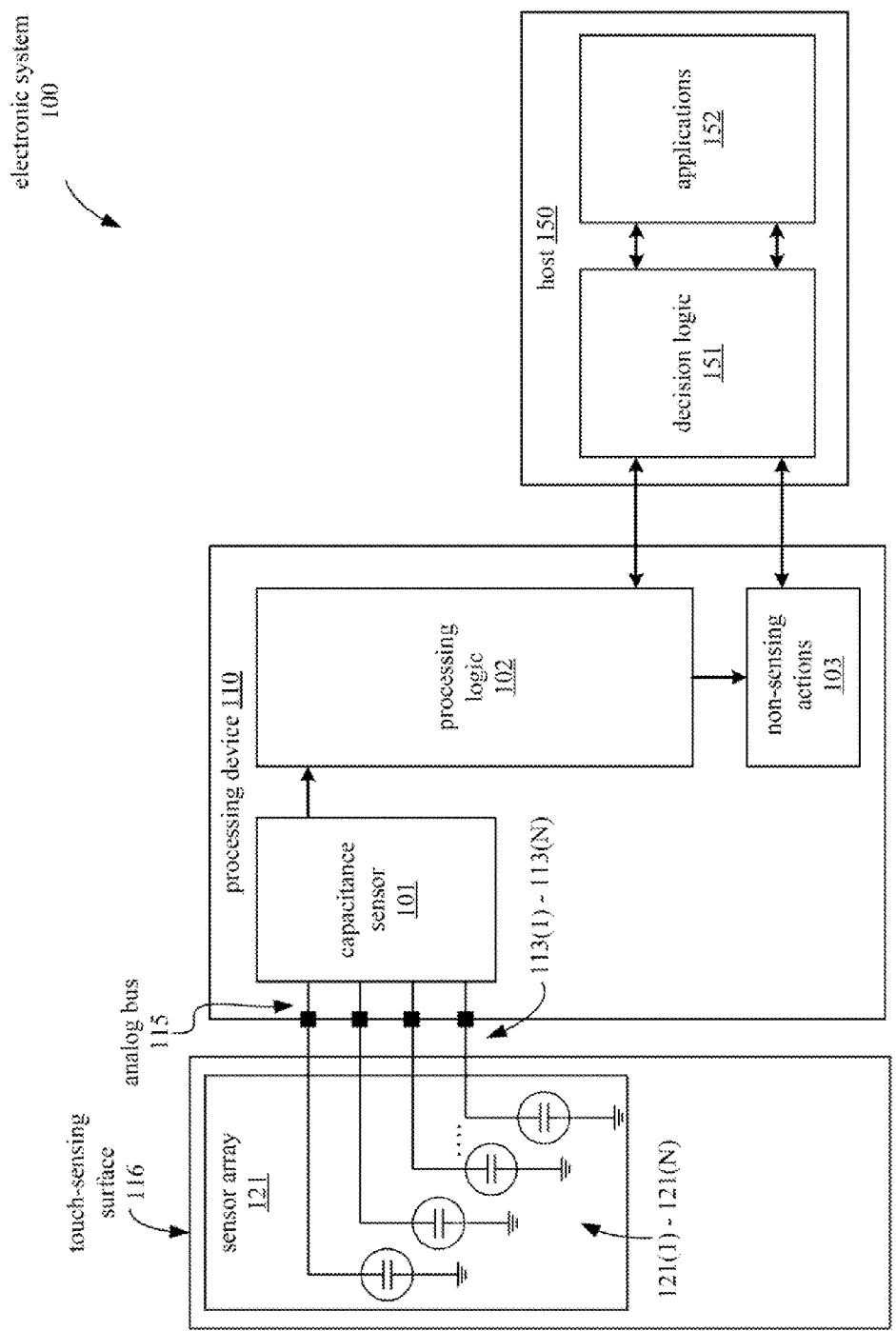
FIG. 1 illustrates a block diagram of one embodiment of an electronic system that processes touch sensor data.

FIG. 1 illustrates a block diagram of one embodiment of an electronic system 100 including processing logic 102 that may be configured to perform a correlation process for identifying contacts between a scan of a touch-sensing surface and a subsequent scan. The electronic device 100 includes a touch-sensing surface 116 (e.g., a touchscreen, or a touch pad) coupled to a processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via an analog bus 115 transporting multiple signals. In this embodiment, each sensor element 121(1)-121(N) is represented as a capacitor. The capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array, tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, orientation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
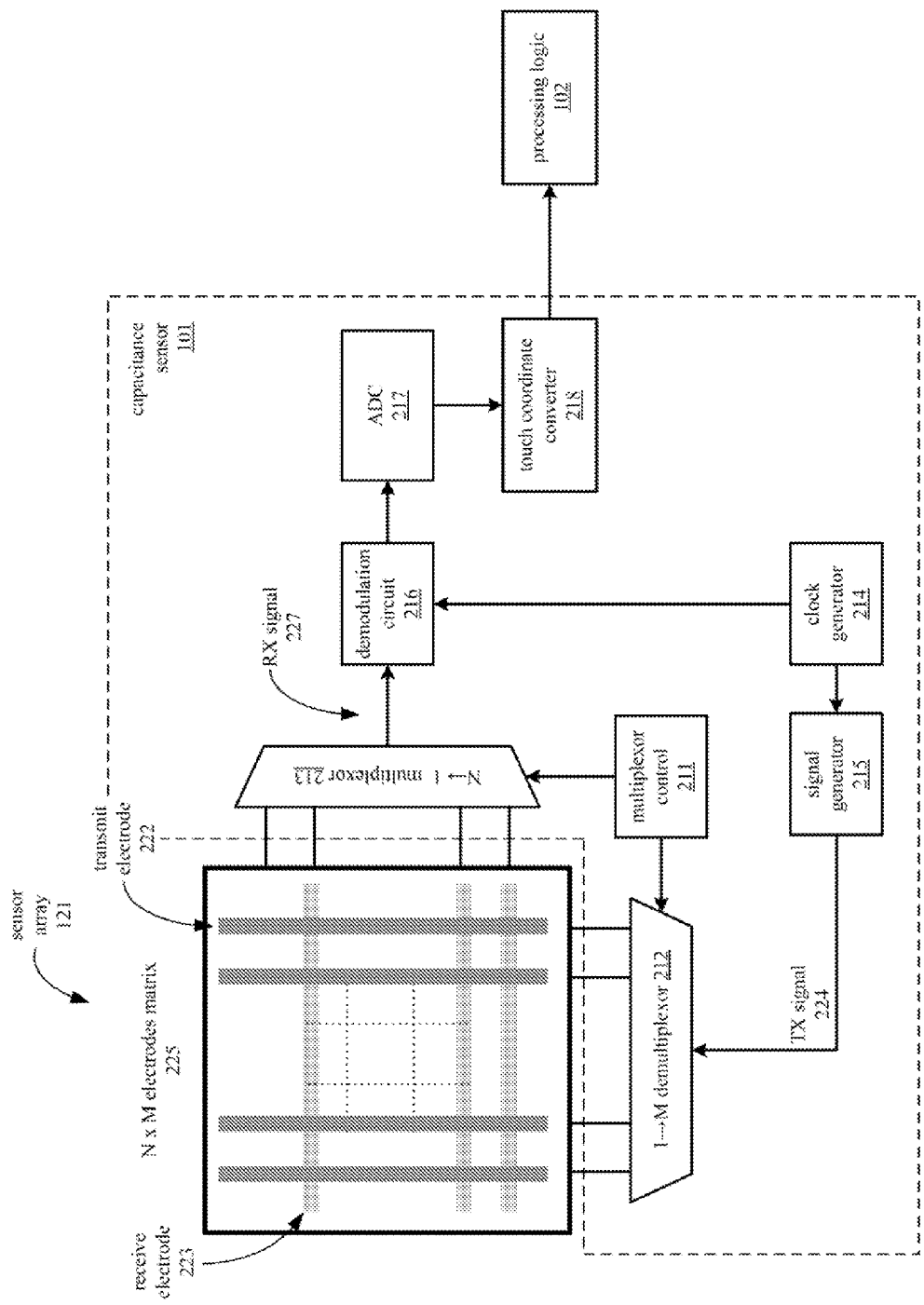
FIG. 2 illustrates a block diagram of an embodiment of an electronic system that processes touch sensor data.

FIG. 2 is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, the sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

In one embodiment, a touch-sensing surface 116 including a sensor array 121 may be scanned by a touch controller in a sequence according to FIG. 3. The touch controller may be implemented in processing device 110. As previously discussed, when a contact 302 moves during the time between scans, the order in which the contact 302 is detected relative to other contacts, such as contact 301, may be changed. For example, following a first scan with contacts at location 301 and 302(1), the contact at location 301 is detected before the contact at location 302(1). Following a subsequent scan, with contacts at locations 301 and 302(2), the contact at location 302(2) is detected by the scan before the contact at location 301.

In one embodiment, the touch controller may assign a contact identifier to each contact location detected following a scan. In one embodiment, the contact identifier is a number or other code that is unique from all other contact identifiers associated with a scan. In one embodiment, the same contact identifiers may be associated with contact locations detected following another scan, such that contact locations detected following different scans but having the same contact identifier are designated as resulting from the same contact at the touch-sensing surface.

For example, in the case of fingers moving across the touch-sensing surface, each finger will have first contact location detected by a first scan and a second contact location detected by a subsequent scan. The touch controller may associate each set of contact location coordinates with a contact identifier. The touch controller can then track the movements of individual fingers across the touch-sensing surface.

In one embodiment, the touch controller assigns the appropriate contact identifier to each contact locations detected by subsequent scans using a search method such as a least squares method or a nearest neighbor method.

In one embodiment, a combination of search methods may be used to correlate the contact locations from one scan to the next. In one embodiment, the computation power used to perform the search methods and the resulting accuracy of the search methods may differ. For example, one embodiment of a touch controller may use a more accurate least squares method (high computation power) in combination with a less accurate nearest neighbor method (low computation power).

In one embodiment, the touch controller may operate in a first mode, using the least squares method for correlating touch contacts between two scans when the number of contacts is less than or equal to a threshold number of contacts. In response to the number of contacts exceeding the threshold, the touch controller may switch to a second mode where the touch controller correlates the detected contact locations using the nearest neighbor method. For example, the least squares method may be used to correlate all of the detected contacts between scans when up to three contacts are detected at the touch-sensing surface. The nearest neighbor method may be used to correlate all of the detected contacts when more than three contacts are detected.

In one embodiment, the touch controller identifies touch contacts that have not moved in the time between the first scan and the following scan and excludes the unmoved contacts from the correlation process. For example, the touch controller may identify an unmoved contact from a contact location detected by the first scan that is identical or within a small threshold distance from a contact location detected by the second scan. The touch controller may then exclude the unmoved contact, along with any other unmoved contacts, from the least squares or nearest neighbor calculations. Note that the number of unmoved contacts may then be subtracted from the total number of contacts to determine which of the least squares of nearest neighbor methods to use.

In one embodiment, a reliable method for correlating contact locations detected by two or more sequential scans is the least squares method. The least squares calculation is based on searching for the minimum of the sum of the squares of the distance of two neighboring contact locations, as described by Equation 1 below.

$$\min \Sigma_n (L_{t1/t2})^2 \qquad \text{(Equation 1)}$$

In Equation 1, n is the number of contacts, and L is the distance between contact locations detected at times t1 and t2. The number of possible combinations of the sums of distances is n factorial (n!).

Figure 4:
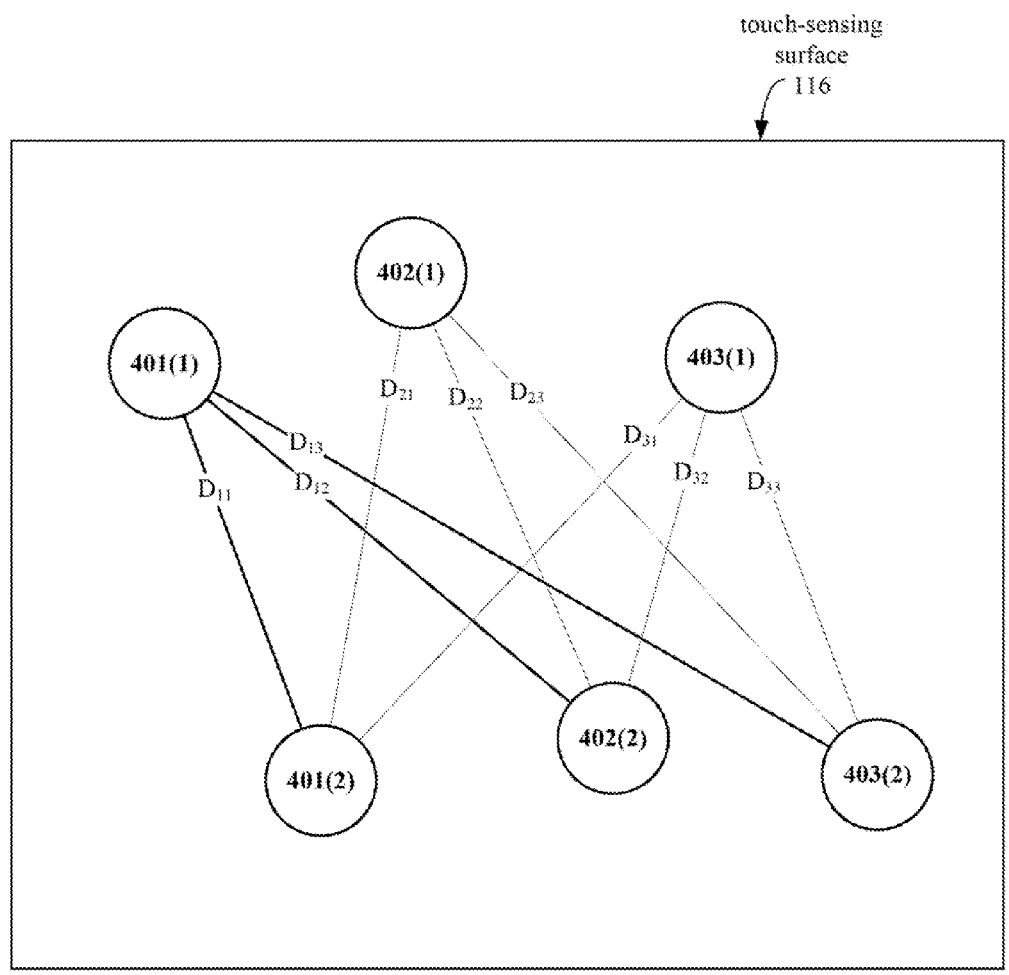
FIG. 4 illustrates an embodiment of a touch sensing surface implementing a least squares correlation method.

FIG. 4 illustrates a least squares calculation performed to correlate three contact locations 401(1), 402(1), and 403(1) detected by a first scan of a touch sensing surface 116 with three contact locations 401(2), 402(2), and 403(2) detected by a second subsequent scan. The least squares calculation for the situation illustrated in FIG. 4 is detailed in Table 1 below.

TABLE 1

| | Contact locations at t1 and t2 | | | |
|---|---|---|---|---|
| Combination | 401(1) | 402(1) | 403(1) | Sum of squared distances |
| 1 | 401(2) | 402(2) | 403(2) | $S1 = (D_{11})^2 + (D_{22})^2 + (D_{33})^2$ |
| 2 | 401(2) | 403(2) | 402(2) | $S2 = (D_{11})^2 + (D_{23})^2 + (D_{32})^2$ |
| 3 | 402(2) | 401(2) | 403(2) | $S3 = (D_{12})^2 + (D_{21})^2 + (D_{33})^2$ |
| 4 | 402(2) | 403(2) | 401(2) | $S4 = (D_{12})^2 + (D_{23})^2 + (D_{31})^2$ |
| 5 | 403(2) | 401(2) | 402(2) | $S5 = (D_{13})^2 + (D_{21})^2 + (D_{32})^2$ |
| 6 | 403(2) | 402(2) | 401(2) | $S6 = (D_{13})^2 + (D_{22})^2 + (D_{31})^2$ |

With reference to Table 1, a touch controller performing the least squares calculation on the contacts 401-403 calculates a sum of squared distances for each possible combination of correlations. For example, combination 3 in Table 1 correlates contact location 401(1) with 402(2), 402(1) with 401(2), and 403(1) with 403(2). For this combination, the sum of squared distances S3 is calculated by calculating the distances $D_{12}$, $D_{21}$, and $D_{33}$ between each pair of corresponding contact locations of combination 3 and summing the squared distances. The least squares determination includes a similar calculation for each of the combinations 1-6 to determine a sum of squared distances S1-S6 associated with each combination. The combination having the smallest sum of squared distances is accepted as an accurate correlation. For example, if S1 is the smallest among the sums S1-S6, then combination 1, correlating 401(1) with 401(2), 402(1) with 402(2), and 403(1) with 403(2), is accepted as an accurate correlation.

In one embodiment, each pair of correlated contact locations may be assigned a unique contact identifier. In one embodiment, the correlation process may be repeated with subsequent scans to correlate contact locations detected over a series of scans.

In one embodiment, the time for performing the least squares calculation for correlating contact locations between subsequent scans increases with the number of contacts for which the calculation is performed. Table 2 below lists the time used for the least squares calculation when 0-5 contacts are being correlated, according to an embodiment using a CY8CTMA120 touch controller (manufactured by Cypress Semiconductor Corporation of San Jose, Calif.) at 5V and 24 MHz.

TABLE 2

| Number of contacts | Number of calculated squared distances | Calculation time |
|---|---|---|
| 0 | 0 | 0.00 ms |
| 1 | 1 | 0.15 ms |
| 2 | 2! = 2 | 0.52 ms |
| 3 | 3! = 6 | 1.32 ms |
| 4 | 4! = 24 | 3.80 ms |
| 5 | 5! = 120 | 13.34 ms |

As described in Table 2, the time for performing a least squares calculation increases from 1.32 milliseconds (ms) for three contacts to 13.34 ms for five contacts. Since the increase in calculation time can cause a delay in the response time of a touch panel or other device in which the correlation process is performed, a simpler and less computation intensive calculation, such as a nearest neighbor method, may be used when the number of contacts exceeds a threshold number of contacts. For example, a touch controller may use the least squares method to correlate contacts between subsequent scans when the number of contacts is less than or equal to the threshold number of three contacts, and may use the nearest neighbor method to correlate the contacts when the number of contacts is greater than three contacts.

Figure 5:
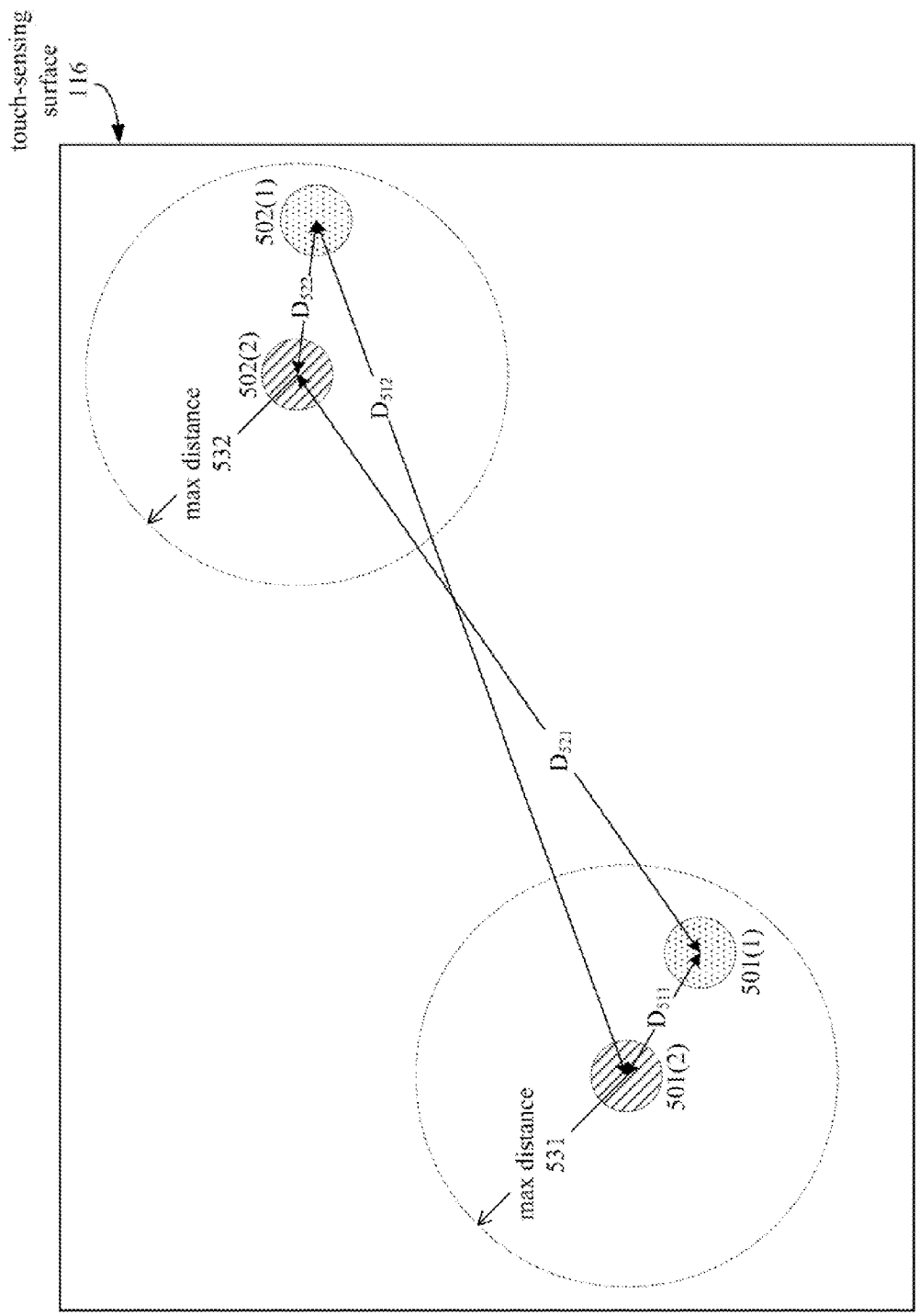
FIG. 5 illustrates an embodiment of a touch sensing surface implementing a nearest neighbor correlation method.

The nearest neighbor method is illustrated in FIG. 5. With reference to FIG. 5, the maximum distances 531 and 532 define maximum distances from contact locations 501(2) and 502(2) detected by a scan. Upon detecting the contacts at locations 501(2) and 502(2) during a scan of the touch-sensing surface, a touch controller may correlate the newly detected contact locations 501(2) and 502(2) with contact locations 501(1) and 502(1) detected by a previous scan.

A touch controller implementing the nearest neighbor method correlates the contact location 501(2) with a contact location 501(1) by searching within a predefined maximum distance 531 from the contact location 501(2). According to the nearest neighbor method, the contact location within the maximum distance 531 that is nearest to the contact location 501(2) is identified by the touch controller as having been caused by the same object contacting the touch sensing surface, such as a finger.

In an alternative embodiment, the touch controller implementing the nearest neighbor method does not limit the search to the area within the max distance threshold 531 or 532, but may search a larger area, such as the entire touch-sensing surface.

In one embodiment, the nearest neighbor method may be performed by comparing distance between contact locations. For example, a touch controller that is determining which of the contact locations 501(1) or 502(1) corresponds to contact location 501(2) may compare distance $D_{511}$ (between 501(2) and 501(1)) and $D_{512}$ (between 501(2) and 502(1)). Since $D_{511}$ is less than $D_{512}$, and $D_{511}$ is also less than the max distance 531, the contact location 501(1) is identified as corresponding to contact location 501(2).

In one embodiment, once the contact location 501(2) is correlated with 501(1), the contact location 502(2) may be correlated with 502(1) by default. Alternatively, the nearest neighbor calculations may be performed again for contact location 502(2).

In one embodiment, the nearest neighbor method can be used to correlate all of the contact location from a scan when more than a threshold number of contacts is detected. When less than or equal to the threshold number of contacts is detected, the more accurate and more computationally intensive least squares method may be used. Assuming that the movement speed of contacts decreases when more contacts are being applied to the touch-sensing surface (such as when multiple fingers are applied to a touchpad), the use of a faster correlation method, such as the nearest neighbor method, does not cause a noticeable decrease in correlation accuracy.

In one embodiment, the touch controller assigns a unique contact identifier to each corresponding contact location identified by the correlation process.

In one embodiment, the touch controller may switch modes between using a first correlation process, such as a least squares calculation, and a second correlation process, such as a nearest neighbor calculation, based on other factors besides or in addition to the number of contacts detected at the touch-sensing surface. For example, the touch controller may switch modes based on a direction of movement of contact locations, as indicated by a vector between previously correlated contact locations. Alternatively, the touch controller may switch modes based on an acceleration of the contact. For example, if the contact is accelerating, the touch controller may switch from a more computationally intensive correlation process, such as the least squares method, to a faster correlation process, such as the nearest neighbor method.

In one embodiment, the touch controller may switch modes based on the size of one or more contacts at the touch-sensing surface. For example, in an embodiment where the touch-sensing surface is used to simulate buttons, a larger contact area being applied to the touch-sensing surface (i.e., by a finger) may indicate a button press rather than a gesture. Accordingly, the touch controller may switch modes to a less accurate and faster correlation method when accurate correlation of moving contacts is less important.

In one embodiment, the touch controller may switch modes based on a power mode or other operating mode of the touch controller or an electronic device in which the touch controller is implemented. For example, the touch controller may switch to a faster and less computationally intensive correlation process when the electronic device is switched to a power conserving mode, to reduce the power consumption of the touch-controller. In one embodiment, the touch controller may switch based on remaining battery life of the electronic device, or whether the electronic device is plugged into a power source such as an outlet.

In one embodiment, the touch controller may switch modes based on a heuristic that tracks the behavior of a user. For example, such a heuristic may determine that a user of the touch-sensing surface typically makes slow gestures, meaning that the contact locations change little in between scans. Accordingly, the touch controller may switch to a less accurate and less computationally intensive correlation process (i.e., nearest neighbor). In one embodiment, the touch controller may switch modes based on the spacing between contacts, size, or other characteristics of a user's gestures.

In one embodiment, the touch controller may switch modes based on the application for which the touch-sensing surface is used. For example, in an electronic device running a drawing application, the touch controller may switch to a more accurate correlation process, such as least squares. The touch controller in the same electronic device may switch to a faster correlation process, such as nearest neighbor, when speed is important, such as when a game is being played.

In one embodiment, the touch controller may switch modes based on user settings. For example, a user may specify the threshold above which the touch controller switches modes.

Figure 6:
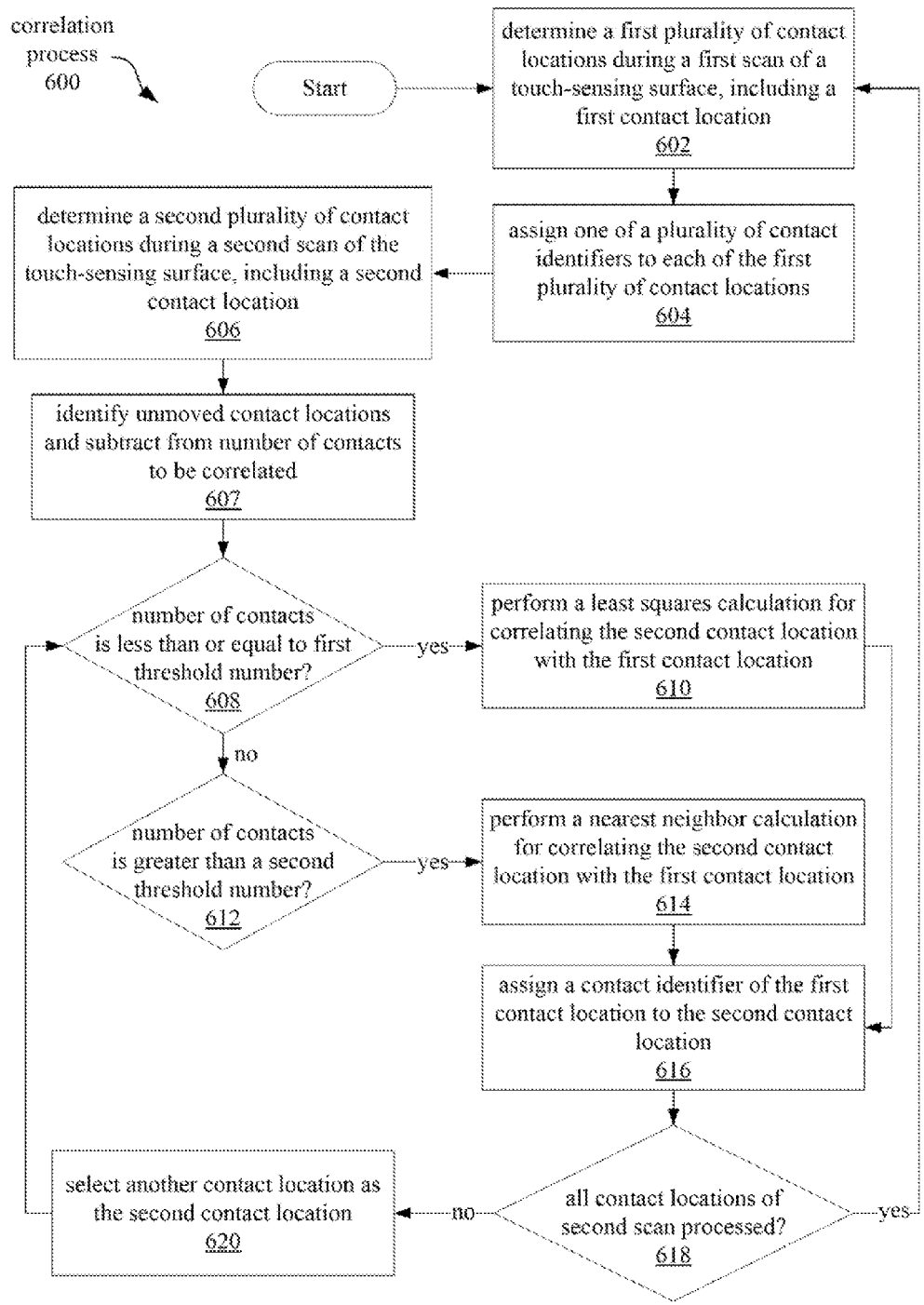
FIG. 6 is a flow diagram illustrating a process for correlating contact locations detected by a first scan with contact locations detected by a subsequent scan, according to an embodiment.

FIG. 6 illustrates an embodiment of a process for correlating contact locations detected during a scan of a touch-sensing surface with contact locations detected during a previous scan of the touch-sensing surface. The correlation process 600 may be performed to identify contact locations caused by the same object (such as a finger), but detected by separate scans of the touch-sensing surface. The correlation process 600 may be performed by a touch controller. In one embodiment, such a touch controller may be implemented in processing logic, such as processing logic 102 as illustrated in FIGS. 1 and 2, and may be configured to detect contacts at a touch sensing surface 116.

The correlation process 600 begins at block 602. At block 602, the touch controller performs a scan of the touch-sensing surface to determine a first plurality of contact locations. The first plurality of contact locations includes a first contact location. From block 602, the process 600 continues at block 604.

At block 604, the touch controller assigns one of a plurality of contact identifiers to each of the first plurality of contact locations. In one embodiment, the contact identifier may be a sequence of numbers or a digital code that is unique for each of the contact locations in a given set of contact locations detected by the same scan. In one embodiment, the assignment of contact identifiers to the first plurality of contact locations may be accomplished using a correlation process similar to process 600. From block 604, the process 600 continues at block 606.

At block 606, the touch controller scans the touch-sensing surface to determine a second plurality of contact locations. The second plurality of contact locations includes a second contact location. From block 606, the process 600 continues at block 607.

At block 607, the touch controller identifies contact locations that have not moved between the first scan and the second scan. In one embodiment, the touch controller subtracts the unmoved contact locations from the number of contacts to be compared to the threshold number at block 608. From block 607, the process 600 continues at block 608.

At block 608, the touch controller determines whether the number of contacts is less than or equal to a first threshold number. In one embodiment, the number of contacts is based on the number of contact locations of either the first plurality of contact locations or the second plurality of contact locations. If the actual number of contacts (based on the results of the first or second scan) is not less than or equal to the threshold number of contacts, the process continues at block 612. In one embodiment, the threshold number of contacts may be three, or may be some other number of contacts for which the time for performing a least squares or other computation intensive correlation method is less than a predetermined time.

At block 612, the touch controller determines whether the number of actual contacts is greater than a second threshold number. In one embodiment, the second threshold number is the same as the first threshold number. For example, the first threshold and the second threshold numbers may be three, such that if the actual number of contacts is less than or equal to three, the process 600 continues from block 608 to block 610, but when the actual number of contacts is greater than three, the process 600 continues from block 608 to 612, to 614.

In an alternative embodiment, the second threshold number is higher than the first threshold number. In this case, if the actual number of contacts does not satisfy the conditions of blocks 608 and 612, the process 600 may perform some other operation (not shown), such as continuing to process the contact locations using another correlation method different from the least squares or nearest neighbor methods. Thus, such an embodiment may use three or more different correlation methods (which may or may not include the least squares or nearest neighbor methods), selecting an appropriate correlation method based on whether the number of contacts detected falls within a certain range.

The process 600 arrives at block 610 from block 608, having determined that the number of actual contacts, minus those that have not moved, is less than or equal to the threshold number of contacts. At block 610, the touch controller performs a least squares calculation to correlate the second contact locations with the first contact locations.

The process 600 arrives at block 614 from block 612 when the number of actual contacts, minus those that have not moved, is greater than the threshold number of contacts. At block 614, the touch controller performs a nearest neighbor calculation to correlate the second contact location with the first contact location.

From block 610 or 614, the process 600 continues at block 616. At block 616, the touch controller, in response to correlating the second contact location with the first contact location, assigns a contact identifier of the first contact location to the associated second contact location. In one embodiment, if the least squares calculation was used, the correlation of the second contact location with the first contact location may occur along with the correlation of the other second scan contact locations with corresponding first scan contact locations. Alternatively, if a method such as the nearest neighbor calculation is used, the contacts may be correlated independently, in sequence. From block 616, the process 600 continues at block 618.

At block 618, the touch controller determines if all the contact locations of the second plurality of contacts (detected by the second scan) have been processed. In one embodiment, the contact locations of the second plurality of contacts have been processed when all of the second plurality of contact locations has been either correlated with one of the first plurality of contacts or determined to be a new contact without a corresponding contact location from the first plurality of contact locations. At block 618, if all the second scan contact locations have not been processed, the process 600 continues at block 620, where another contact location from the second plurality of contacts is selected as the second contact location. The newly selected second contact location is then processed according to blocks 608-616. By these operations, each of the second plurality of contact locations is processed in turn. At block 618, if all the second scan contact locations have been processed, the process 600 continues back to block 602, where the touch controller performs the next scan of the touch-sensing surface.

Figure 7:
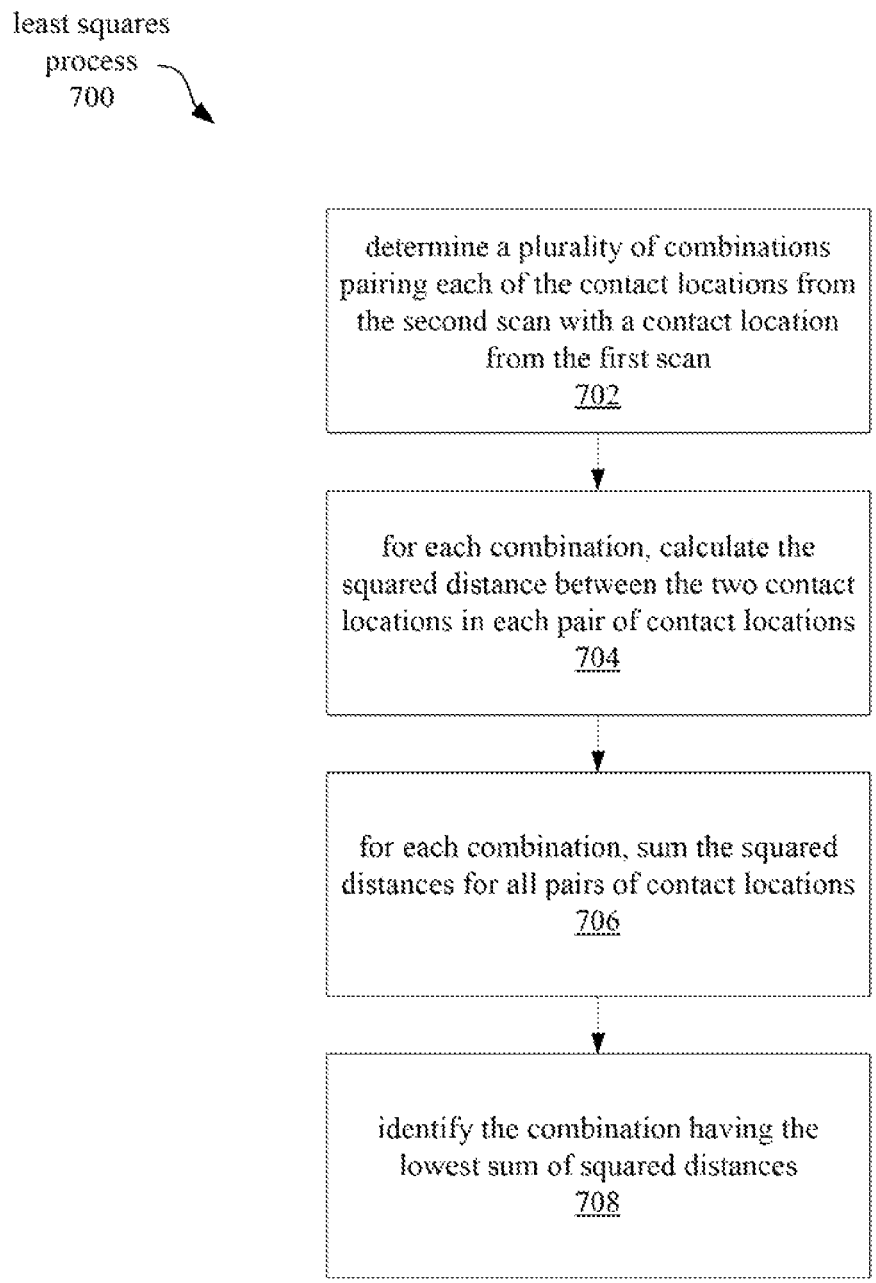
FIG. 7 is a flow diagram illustrating a least squares correlation process, according to an embodiment.

FIG. 7 illustrates an embodiment of a process for using a least squares calculation for correlating contact locations detected by a scan of a touch-sensing surface with contact locations detected by a previous scan of the touch-sensing surface. In one embodiment, the operations of least squares process 700 may correspond to operations performed at block 610 of process 600.

The least squares process 700 begins at block 702. At block 702, the touch controller determines a plurality of combinations pairing each of the second plurality of contact locations (detected by the second scan) with a contact location from the first plurality of contact locations (detected by the first scan). For example, with reference to Table 1, the touch controller may identify six possible correlation combinations for a first scan with three contact locations 401(1), 402(1), and 403(1), and a second scan with three contact locations 401(2), 402(2), and 403(2). Each of the combinations pairs one of the second plurality of contact locations with one of the first plurality of contact locations. From block 702, the process 700 continues at block 704.

At block 704, the touch controller calculates, for each of the combinations identified at block 702, a squared distance between the two contact locations in each pair of contact locations. For example, with reference to Table 1, the touch controller squares the distances $D_{11}$, $D_{22}$, and $D_{33}$ for combination 1. Combination 1 pairs 401(1) with 401(2), 402(1) with 402(2), and 403(1) with 403(2), corresponding to the distances $D_{11}$, $D_{22}$, and $D_{33}$. The touch controller similarly squares the distances for each of the other possible combinations 2-6. From block 704, the process 700 continues at block 706.

At block 706, for each combination, the touch controller sums the squared distance for all the pairs of contact locations. With reference to Table 1, the touch controller may add the squared distances together for each of the combinations 1-6. From block 706, the process 700 continues at block 708.

At block 708, the touch controller identifies the combination having the lowest sum of squared distances. For example, with reference to Table 1, the touch controller may search for the lowest value from among the sums S1, S2, S3, S4, S5, and S6. In one embodiment, the combination having the lowest sum of squared distances represents an accurate correlation of contact locations from the second scan with contact locations from the first scan. For example, if S1 is the lowest sum, then the touch controller correlates the contacts according to combination 1, which pairs contact locations 401(1) with 401(2), 402(1) with 402(2), and 403(1) with 403(2). In one embodiment, the touch controller may then proceed to block 616 of process 600, where the appropriate contact identifiers are assigned to the contact locations.

Figure 8:
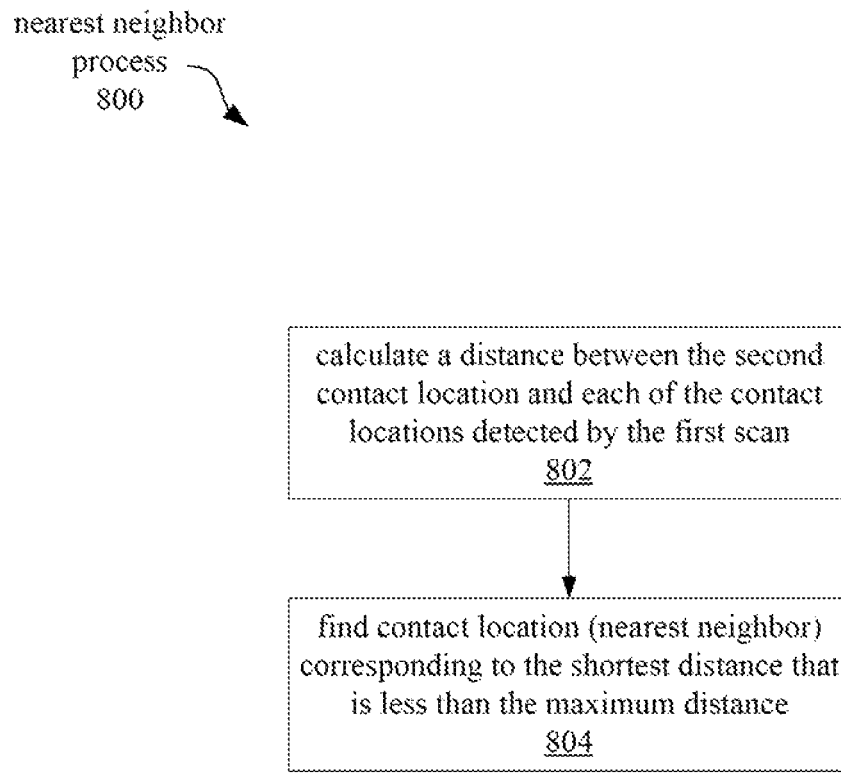
FIG. 8 is a flow diagram illustrating a nearest neighbor correlation process, according to an embodiment.

FIG. 8 illustrates an embodiment of a process for using a nearest neighbor calculation for correlating contact locations detected by a scan of a touch-sensing surface with contact locations detected by a previous scan of the touch-sensing surface. In one embodiment, the operations of nearest neighbor process 800 may correspond to operations performed at block 614 of process 600.

The nearest neighbor process 800 begins at block 802. At block 802, the touch controller calculates a distance between a second contact location (from the second plurality of contact locations detected by the second scan) and each of the contact locations of the first plurality of contact locations (detected by the first scan). For example, with reference to FIG. 5, the touch controller may calculate distances $D_{511}$ and $D_{512}$ between contact location 501(2) detected by a second scan and each of the contact locations 501(1) and 502(1) detected by a previous scan. From block 802, the process 800 continues at block 804.

At block 804, the touch controller finds a contact location corresponding to the shortest distance that is less than the maximum distance. For example, with reference to FIG. 5, the distance $D_{511}$ is the shortest distance and is also less than the maximum distance 531. The contact location 501(1) corresponding to distance $D_{511}$ is therefore selected as the nearest neighbor to 501(2). From block 804, the process 800 continues at block 616 of process 600.

At block 616, the contact identifier of the nearest neighbor identified at block 804 (which is treated as the first contact location) is assigned to the second contact location to correlate the second contact location with the first contact location.

For example, the contact identifier of contact location 501(1), determined to be the nearest neighbor to contact location 501(2), is assigned to the contact location 501(2) to correlate 501(2) with 501(1). Thus, 501(1) and 501(2) have the same contact identifiers and can be treated as having been caused by the same objects, such as fingers, in continuous contact with the touch-sensing surface.

By using the nearest neighbor process 800 for a larger number of contacts and the least squares process 700 for a smaller number of contacts, the process 600 may correlate contacts between scans without noticeably degrading the responsiveness of a touchpad or touchscreen.

Embodiments of the present invention, described herein, include various operations. These operations may be performed by hardware components, software, firmware, or a combination thereof. As used herein, the terms "coupled to" or "coupled with" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
    determining a first plurality of contact locations in view of a first scan of a touch-sensing surface;
    determining a second plurality of contact locations in view of a second scan of the touch-sensing surface;
    identifying a number of total contact locations corresponding to touch contacts that have moved between the first scan and the second scan, including:
        identifying a number of unmoved contact locations corresponding to touch contacts that have not moved between the first and second scans, and
        excluding the number of unmoved touch contacts from the number of total contact locations;
    comparing the identified number of total contact locations with a threshold number;
    in accordance with a determination that the number of total contact locations is greater than the threshold number, performing a first correlation process to correlate the first plurality of contact locations with the second plurality of contact locations; and
    in accordance with a determination that the number of total contact locations is equal to or less than the threshold number, performing a second correlation process to correlate the first plurality of contact locations with the second plurality of contact locations.

2. The method of claim 1, further comprising:
    identifying one or more touch contacts associated with the first plurality of contact locations that have not moved after the first scan,
    wherein the number of total contact locations excludes the contact locations of the one or more touch contacts that have not moved after the first scan.

3. The method of claim 1, wherein the first correlation process is a least squares based process.

4. The method of claim 1, wherein the second correlation process is a nearest neighbor based process.

5. The method of claim 1, wherein a computational power of the first correlation process is different than a computational power of the second correlation process.

6. The method of claim 1, wherein the correlating of the first plurality of contact locations with the second plurality of contact locations comprises identifying a contact location associated with a touch contact from the first plurality of contact locations of the first scan with a contact location associated with the touch contact from the second plurality of contact locations of the second scan.

7. The method of claim 1, wherein the performing of the first correlation process or the second correlation process is further in view of a direction of movement of contact locations of the first plurality of contact locations and the second plurality of contact locations.

8. The method of claim 1, wherein a computational speed of the first correlation process is different than a computational speed of the second correlation process.

9. The method of claim 1, further comprising:
    determining whether to perform the first correlation process or the second correlation process according to an acceleration of the touch contacts.

10. The method of claim 1, further comprising:
    determining whether to perform the first correlation process or the second correlation process according to a size of the touch contacts.

11. The method of claim 1, further comprising:
    determining whether to perform the first correlation process or the second correlation process according to a power mode of a touch controller.

12. The method of claim 1, further comprising:
    determining whether to perform the first correlation process or the second correlation process according to a battery life.

13. The method of claim 1, further comprising:
    determining whether to perform the first correlation process or the second correlation process according to an application type of an application for which the touch-sensing surface is used.

14. A system comprising:
    a touch-sensing surface; and
    a processor, operatively coupled to the touch-sensing surface, configured to:
    determine a first plurality of contact locations in view of a first scan of the touch-sensing surface;
    determine a second plurality of contact locations in view of a second scan of the touch-sensing surface;
    identify a number of total contact locations corresponding to touch contacts that have moved between the first scan and the second scan, including:
        identifying a number of unmoved contact locations corresponding to touch contacts that have not moved between the first and second scans, and
        excluding the number of unmoved touch contacts from the number of total contact locations;
    compare the identified number of total contact locations with a threshold number;
    in accordance with a determination that the number of total contact locations is greater than the threshold number, perform a first correlation process to correlate the first plurality of contact locations with the second plurality of contact locations; and
    in accordance with a determination that the number of total contact locations is equal to or less than the threshold number, perform a second correlation process to correlate the first plurality of contact locations with the second plurality of contact locations.

15. The system of claim 14, wherein the processor is further to configured to:
    identify one or more touch contacts associated with the first plurality of contact locations that have not moved after the first scan,
    wherein the number of total contact locations excludes the touch locations of the one or more touch contacts that have not moved after the first scan.

16. The system of claim 14, wherein the first correlation process is a least squares based process.

17. The system of claim 14, wherein the second correlation process is a nearest neighbor based process.

18. The system of claim 14 wherein a computational power of the first correlation process is different than a computational power of the second correlation process.

19. The system of claim 14, wherein the correlating of the first plurality of contact locations with the second plurality of contact locations comprises identifying a contact location associated with a touch contact from the first plurality of contact locations of the first scan with a contact location associated with the touch contact from the second plurality of contact locations of the second scan.

20. The system of claim 14, wherein the performing of the first correlation process or the second correlation process is determined further in view of a direction of movement of contact locations of the first plurality of contact locations and the second plurality of contact locations.

21. The system of claim 14 wherein a computational speed of the first correlation process is different than a computational speed of the second correlation process.

22. An apparatus comprising:
a touch controller associated with a touch-sensing surface;
a processor coupled to the touch controller; and
a memory coupled with the processor, wherein the memory stores instructions which, when executed by the processor, cause the processor to perform operations comprising:
determining a first plurality of contact locations in view of a first scan of a touch-sensing surface;
determining a second plurality of contact locations in view of a second scan of the touch-sensing surface;
identifying a number of total contact locations corresponding to touch contacts that have moved between the first scan and the second scan, including:
identifying a number of unmoved contact locations corresponding to touch contacts that have not moved between the first and second scans, and
excluding the number of unmoved touch contacts from the number of total contact locations;
comparing the identified number of total contact locations with a threshold number;
in accordance with a determination that the number of total contact locations is greater than the threshold number, performing a first correlation process to correlate the first plurality of contact locations with the second plurality of contact locations; and
in accordance with a determination that the number of total contact locations is equal to or less than the threshold number, performing a second correlation process to correlate the first plurality of contact locations with the second plurality of contact locations.

23. The apparatus of claim 22, the operations further comprising:
identifying one or more touch contacts associated with the first plurality of contact locations that have not moved after the first scan,
wherein the number of total contact locations excludes the touch locations of the one or more touch contacts that have not moved after the first scan.

24. The apparatus of apparatus 22, wherein the first correlation process is a least squares based process.

25. The apparatus of apparatus 22, wherein the second correlation process is a nearest neighbor based process.

26. The apparatus of apparatus 22, wherein a computational power of the first correlation process is different than a computational power of the second correlation process.

27. The apparatus of apparatus 22, wherein the correlating of the first plurality of contact locations with the second plurality of contact locations comprises identifying a contact location associated with a touch contact from the first plurality of contact locations of the first scan with a contact location associated with the touch contact from the second plurality of contact locations of the second scan.

* * * * *